US012387556B2

(12) United States Patent
Attard et al.

(10) Patent No.: US 12,387,556 B2
(45) **Date of Patent: *Aug. 12, 2025**

(54) METHOD FOR A GAMING SYSTEM

(71) Applicant: Play'n Go Marks Ltd, Valletta (MT)

(72) Inventors: Malcolm Attard, Valletta (MT); Charlotte Miliziano, Valletta (MT); Martin Zettergren, Valletta (MT); Johan Spjuth, Valletta (MT); Johan Törnqvist, Valletta (MT)

(73) Assignee: Play'n Go Marks Ltd, Valletta (MT)

(*) Notice: Subject to any disclaimer, the term of this patent is extended or adjusted under 35 U.S.C. 154(b) by 270 days.

This patent is subject to a terminal disclaimer.

(21) Appl. No.: 18/197,324

(22) Filed: May 15, 2023

(65) Prior Publication Data

US 2023/0401924 A1 Dec. 14, 2023

Related U.S. Application Data

(63) Continuation-in-part of application No. 17/546,559, filed on Dec. 9, 2021, now Pat. No. 11,651,650.

(30) Foreign Application Priority Data

Dec. 11, 2020 (SE) .................................. 2051444-4

(51) Int. Cl.
*G07F 17/32* (2006.01)

(52) U.S. Cl.
CPC ...... *G07F 17/3223* (2013.01); *G07F 17/3211* (2013.01); *G07F 17/3227* (2013.01); *G07F 17/3269* (2013.01)

(58) Field of Classification Search
CPC ............ G07F 17/3223; G07F 17/3211; G07F 17/3227; G07F 17/3269
See application file for complete search history.

(56) References Cited

U.S. PATENT DOCUMENTS

| | | | |
|---|---|---|---|
| 10,055,930 | B2 | 8/2018 | Ramos et al. |
| 10,424,151 | B1 | 9/2019 | Higgins et al. |
| 2002/0147040 | A1 | 10/2002 | Walker et al. |
| 2005/0043089 | A1 | 2/2005 | Nguyen et al. |
| 2005/0059493 | A1 | 3/2005 | Tyson et al. |
| 2012/0172133 | A1 | 7/2012 | Trexler et al. |
| 2013/0102394 | A1 | 4/2013 | Seitz et al. |
| 2019/0035208 | A1 | 1/2019 | Simons et al. |
| 2020/0168045 | A1 | 5/2020 | Idris |

FOREIGN PATENT DOCUMENTS

AU 2018220144 A1 9/2018

OTHER PUBLICATIONS

Extended European Search Report dated May 17, 2022 for EP Application No. 21212831.8, 9 pages.
Swedish Search Report dated Aug. 25, 2021 for Swedish Patent Application No. 2051444-4, 3 pages.

*Primary Examiner* — Kevin Y Kim
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving an attraction power of a game provided in relation to the gaming system. The present disclosure also relates to a corresponding gaming system.

20 Claims, 4 Drawing Sheets

METHOD FOR A GAMING SYSTEM

CROSS-REFERENCE TO RELATED APPLICATIONS

This application is a continuation-in-part of U.S. patent application Ser. No. 17/546,559, filed on Dec. 9, 2021, which claims priority to Swedish Patent Application No. 2051444-4, filed on Dec. 11, 2020. The disclosures of each of the above applications are incorporated herein by reference in their entirety.

TECHNICAL FIELD

The present disclosure relates to a computer implemented method performed by a gaming system. In particular, the present disclosure relates to a scheme for further improving functioning of a game provided in relation to the gaming system. The present disclosure also relates to a corresponding gaming system.

BACKGROUND

Games of chance are known and widely played for recreational purposes. The gaming industry has come to recognize that to sustain long term success it must be constantly innovative in introducing new games and new gaming concepts to the gaming public as well as be responsive to specific rules and regulations issued by regulatory authorities in relation to the games offered and responsible game play.

One example of this innovating drive can be appreciated in the embrace of the Internet and online gaming by the gaming industry. A common trend within the online gaming industry is to provide potentially new and current players with new means for attracting and ensuring that players remain at the online site, controlled by a gaming operator, providing the games, as well as ensuring that players play responsibly.

Different mechanisms have been implemented in order to ensure that players play responsibly including mechanism that interrupt a game after a requisite time has lapsed, after a specified credit has been consumed or after a big payoff occurs. However, it has been found that such mechanisms are no longer sufficient. There is therefore a need to introduce further measures to ensure responsible play as well as balance this requirement with the attraction power of a game.

SUMMARY

According to an aspect of the present disclosure, the above is at least partly met by a method of controlling access to gaming services provided by a server, the server arranged in network communication with a gaming terminal operated by a player, the gaming terminal comprising a display unit adapted to provide a graphical user interface (GUI), wherein the method comprises selecting, at the server, an active time period and a passive time period for each gaming service, wherein the active time period relates to active interaction of the player with the GUI and the passive time period relates to passive interaction of the player with the GUI, wherein the active interaction comprises the player placing one or more bets and the passive interaction comprises the player observing a result of the gaming service, providing, using the server, a series of consecutive gaming services to the gaming terminal during a first predefined time period, determining, using the server, a combination of passive time periods of passive interaction of the player with the GUI taking place during the first predefined time period, defining, using the server, a desired inactivity period for the first predefined time period, determining, using the server, a non-access period based on a comparison between the desired inactivity period and the determined combination of passive time periods, and directing, using the server, the gaming terminal to display a gaming interface within the GUI for a duration relating to the non-access period prior to again providing additional gaming services to the gaming terminal, wherein the gaming interface indicates to the player that the gaming services will not be provided for the duration.

Generally, when the operational scheme according to the present disclosure is applied to a gaming service provided by the server, it may be possible to ensure that players play responsibly while ensuring that the gaming service remains attractive. This could potentially be beneficial to both the player participating in the game and the gaming operator providing the gaming service.

In accordance with the present disclosure, the server will in an adaptive manner control the gaming terminal operated by the player, by means of forming and adjusting how the gaming controls can be operated by the player. The server will start by remotely controlling the display unit of the gaming terminal to display a first gaming interface, where the first gaming interface is adapted in such a manner that the player may initiate a process performed at the server for providing the gaming service to the player. The initiation may for example be performed by the player interacting with the first element of the first gaming interface. In some embodiments the first element comprises an “initiation button”. The first element may however as an alternative or also comprise an area for providing player information, such an identity of the player.

Each gaming service provided to the player is divided into at least two stages, including an active and a passive stage. The active stage is performed for an active time period, relating to active interaction of the player, and the passive stage is performed for a passive time period, relating to passive interaction of the player. Generally speaking, active interaction of the player refers to the player interacting (physically or otherwise) with the gaming terminal in order to effectuate a change or advance towards a conclusion of a gaming service, which is generally referred to herein as the player placing a bet. Accordingly, the active stage of the gaming service can permit the player to make a tactical consideration and to place a bet. Examples of how a player places a bet can include, but are not limited to, the player pressing a button on the gaming terminal, touching a touch-screen, or otherwise acting to select a bet amount, enter a bet for the current gaming service, select a gaming variation or version, and/or start the gaming service to be “played out” or proceed to its conclusion. In some embodiments the bet is placed by the user by means of interacting with the second element comprised with the first gaming interface that is displayed within the GUI of the gaming terminal. It should be appreciated that other forms of active interaction are within the scope of the present disclosure.

As mentioned above, the passive time period relates to passive interaction of the player with the gaming terminal. Generally speaking, passive interaction of the player refers to the player not actively interacting with the gaming terminal during a gaming service. Examples of passive interactions can include, but are not limited to, a player watching an animation or graphics on the GUI or otherwise observing the gaming service (watching the spinning of slot reels or a roulette wheel, cards being shuffled or dealt, etc.), and/or a player pausing between periods of active interaction (e.g., while contemplating whether to continue playing or whether to change a bet amount). For example only, the passive stage may include a portion where the gaming service is "played out" (brought to its conclusion), such as generating random numbers in a lottery, waiting for a bet to be executed, or for slots to rotate, etc. Other example of "happenings" within the passive stage are of course possible and within the scope of the present disclosure. As an example, a result of the gaming service, such as providing the player with a gaming service outcome, may also be included within the passive stage.

In accordance to the discussion above, the access scheme according to the present disclosure may be implemented in conjunction with different gaming concepts. As an example, the gaming service may comprise a gaming, a betting or a lottery component. The gaming service may also comprise a simulation of a slot game, for example including a multi-reel slot game. However, the access scheme according to the present disclosure may also be implemented in relation to skilled based gaming, for example including computer and video games.

As indicated above, there is a desire to ensure that ensure that players play responsibly. At the same time, it may be desirable to ensure that any waiting times are kept as short as possible. This also includes a situation where a player activates a passive stage quicker i.e. plays fast. These two requisites are somewhat opposing, since a short waiting time could result in the player being provided with an increase number of gaming services over a predefined time period. This problem is in accordance to the present disclosure solved by monitoring the waiting time between provided gaming services, and then make up for a reduced waiting time, for instance, in an accumulated manner. The player will thus be allowed to only wait for a short time between the active stages or activate a passive stage quicker but this will then be followed by a "longer" waiting time (defined as a non-access time) once a predetermined number of gaming services have been provided.

In line with the present disclosure a timing scheme is thus implemented, where a combination of passive time periods of passive interaction of the player with the GUI taking place during the first predefined time period is determined. The determined combination of time periods is then used in combination with a desired inactivity period for determining the non-access period. The server will then transition to another mode, where the server controls the gaming terminal to display a gaming interface within the GUI that indicates to the player that the gaming services will not be provided for the duration.

In a general implementation of the present disclosure, the access control scheme is applied to a (large) plurality of gaming terminals connected to the server. An advantage following in such a scenario is that the computational load at the server may be scheduled in such a manner that it may be possible to average the number of gaming terminals that are simultaneously provided gaming services. Specifically, it may in accordance to the present disclosure be possible to schedule the non-access periods for different server connected gaming terminals to fulfill the desire to allow an average number or gaming terminals to be simultaneously provided gaming services. The overall computational resources provided by means of the server may thus be reduced, since possible "computational peaks" may be "flattened".

In some embodiments the second gaming interface comprises a countdown timer displayed within the second gaming interface and operated for the second predefined duration. Alternatively, a pop up including reasons for the non-access period may be displayed within the second gaming interface. The player may thus be made aware of how much time remains until the gaming terminal again may be used for receiving a further gaming service from the server.

As indicated above, the preselected passive time period may in some embodiments be related to a regulative requirement. Accordingly, in some embodiments the server is further adapted to receiving, at the server, an indication of a regulative requirement of the player, a geographical location of the gaming terminal, and determining, using the server, the preselected passive time period based on the indication of the regulative requirement. The server may accordingly and in advantageous automatic manner control the operation of the gaming terminal to fulfil the regulative requirement that is determined for the player or by the player or game provider.

In a possible embodiment, the indication of the regulative requirements is selected from a group comprising at least one of a geographic location for the player, a regulation set by the player, and a regulation set by a provider of the gaming services.

Accordingly, the player may himself set regulations on how he is to be interacting with the gaming services, to ensure that he plays in a safe manner. Similarly, e.g., an operator of the gaming services or server may set such regulative requirements.

The knowledge of the geographical location of the player or the gaming terminal may also or alternatively be used for defining at least one of the first predefined time period, the active time period or the passive time period. As would be apparent from the above, also these time periods could be controlled to ensure that the desirable player balance is achieved, resulting in a desirable gaming behavior for the player. Ensuring a desirable gaming behavior for the player may have a positive long-term effect for the player when engaging in the gaming service, thus also being beneficial for the operator of the server.

A length of the first predefined time period, the active time period or the passive time period must not necessarily be dependent on the geographical location of the player or the gaming terminal. Rather, it may be possible for an operator of the gaming service to set these time periods. Alternatively, even the player could set these time periods, however possibly within a range predefined by the operator, by the geographical location or by legislation.

In some embodiments the active time period may have a predefined length, thereby ensuring that the player must take a break even if the player is playing in comparison slow, again with the intention to ensure that the player plays in a safe manner. The predefined length may in turn be fixed or variable. If variable, the predefined length can be dependent on a speed at which the player e.g. places bets. Accordingly, such a variable predefined length may thus be dependent on the average number of "plays" per time unit. Optionally, this may be combined with a maximum active time period, meaning that the player still has to take a break after a certain time.

In some embodiments, the server may form a portion of the GUI such that the average number of plays per time unit is shown to the player within the GUI visualized at the gaming terminal. Such a portion of the GUI could for example be formed such that the player can see if he is below or above a "desired" level of average number of plays per time unit. Thereby, the player can himself control his behavior to ensure that he stays below the desired level. Accordingly, if the user stays below the desired level he may be allowed to continue playing the game without any imposed non-access periods. Such an implementation may also ensure that the positive long-term effect for the player is achieved when engaging in the gaming service.

In some embodiments, method further comprises determining, using the server, a relation between the active time periods and the passive time periods, and estimating, using the sever, a game speed based on the determined relation. In line with the above, it may as such be possible to direct, using the server, the gaming terminal to display a graphical illustration of the estimated game speed within the GUI. The non-access period may also in some embodiments be further dependent on the estimated game speed.

Still further, it may in some embodiments be possible to instead compare, using the server, the estimated game speed with a predefined game speed, wherein a result of the comparison is applied as a weight to the non-access period, wherein the non-access period is increased if the estimated game speed is larger than the predefined game speed.

In some embodiments such a portion of the GUI may be implemented as a speedometer, a gauge, or a changing spin button. Alternatively, if could be possible to adjust the GUI in another way to communicate e.g. the level of average number of plays per time unit or the time left until a non-access period is to be expected.

Looking at above the other way around, it may also be possible to review the passive interaction of the player with the GUI taking place during the first predefined time. As such, it is not necessary to just look at how the player actively interacts with the game, but it is likewise possible to look at the passive interaction with the game. Thus and in a similar manner as above, the player can himself control his behavior to ensure that he stays above a desired level.

In some embodiments the gaming service initiation comprises at least an identity of the player, a geographical location of the player, or a bet provided by the player in relation to the gaming service provided by the server. Bets may however be placed throughout the series of games. Similarly, the geographical location of e.g. the player or the gaming terminal may not solely be provided by means of the gaming service initiation, such information could also or alternatively be provided using information provided in relation to the network connection between the server and the gaming terminal.

The general discussion provided above is directed to the server providing a series of consecutive gaming services to the gaming terminal during the first predefined time period. The series of gaming services typically includes a plurality of gaming services, such as two –50 gaming services to be provided during the first predefined time period. It may of course be possible to allow more than 50 gaming services to be provided during the first predefined time period, possibly depending on the gaming service provided, a size of the bet provided by the player, the geographical location of the player/gaming terminal, etc. Similarly, the series of consecutive gaming services may in a specific embodiment only include a single gaming service. In this specific embodiment the non-access period will follow directly after a single gaming service has been provided to the gaming terminal, and prior to providing a further gaming service to the user terminal.

As indicated above, the server is in charge of controlling the gaming terminal device to display the table as well as the gaming outcome at the display unit of the gaming terminal device, where the display unit is adapted to present a graphical user interface (GUI). The server may in a corresponding manner be adapted to a graphical representation of at least a portion of the gaming service. Such a GUI may also be arranged to allow the player to directly interact with the server, for example allowing the player to control his/her participation in the game as well as to control a size of the bet placed when participating in the game. The first and/or the second gaming interface may in some embodiments be formed as graphical representations.

Within the context of the present disclosure the expression "forming a graphical representation" should be interpreted broadly. Specifically, it should be understood that the server in some embodiment may be configured to only form a collection of "meta-data" (here corresponding to the graphical representation) that will be rendered at the frontend, such as within the GUI of the gaming terminal device. However, in another embodiment it may be the other way around, meaning that the server will essentially form an image (here corresponding to the graphical representation) that then will be displayed within the GUI of the gaming terminal device. Further alternative implementations along the same mutations are possible and within the scope of the present disclosure. Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure it should be understood that it in some embodiments so that it may be possible to allow the server to control if a specific gaming terminal device is to be allowed to apply the scheme according to the present disclosure. Such control may for example be dependent on a geographical location of the gaming terminal device. Possibly, the geographical location may be selected from a group comprising a city, a country and a continent.

According to another aspect of the present disclosure there is provided an electronic gaming system adapted for access control, the electronic gaming system comprising a server and a gaming terminal arranged in network communication with the server and arranged to be operated by a player, wherein the electronic gaming system is adapted to select, at the server, an active time period and a passive time period for each gaming service, wherein the active time period relates to active interaction of the player with the GUI and the passive time period relates to passive interaction of the player with the GUI, wherein the active interaction comprises the player placing one or more bets and the passive interaction comprises the player observing a result of the gaming service, provide, using the server, a series of consecutive gaming services to the gaming terminal during a first predefined time period, determine, using the server, a combination of passive time periods of passive interaction of the player with the GUI taking place during the first predefined time period, define, using the server, a desired inactivity period for the first predefined time period, determine, using the server, a non-access period based on a comparison between the desired inactivity period and the determined combination of passive time periods, and direct, using the server, the gaming terminal to display a gaming interface within the GUI for a duration relating to the non-access period prior to again providing additional gaming services to the gaming terminal, wherein the gaming interface indicates to the player that the gaming services will not be provided for the duration. This aspect of the present disclosure provides similar advantages and embodiments as discussed above in relation to the previous aspects of the present disclosure.

The gaming system can be a cloud-based computing system and the server can be a cloud server. Thus, the computing power provided by means of the present disclosure may be distributed between a plurality of servers, and the location of the servers may not be explicitly defined. Advantageous following the use of a cloud-based solution is also the inherent redundancy achieved.

In some embodiments the gaming terminal devices may be selected to include e.g. a computer (laptop/stationary), a mobile phone, a tablet, a (gaming) consoles or any other gaming device and gambling terminals. The GUI may in some embodiments be allowed to depend on the type of gaming terminal device.

According to a still further aspect of the present disclosure there is provided a method of controlling access to gaming services provided by a server, the server arranged in network communication with a gaming terminal operated by a player, the gaming terminal comprising a display unit adapted to provide a graphical user interface (GUI), wherein the method comprises receiving, at the server, an indication of a regulative requirement for the player or the gaming terminal, defining, at the server, at least one of a first predefined time period, an active time period or a passive time period based on the indication of the regulative requirement, wherein the active time period relates to active interaction of the player with the GUI and the passive time period relates to passive interaction of the player with the GUI, providing, using the server, a series of consecutive gaming services to the gaming terminal during a first predefined time period, determining, using the server, a combination of passive time periods of passive interaction of the player with the GUI taking place during the first predefined time period, defining, using the server, a desired inactivity period for the first predefined time period, determining, using the server, a non-access period based on a comparison between the desired inactivity period and the determined combination of passive time periods, and directing, using the server, the gaming terminal to display a gaming interface within the GUI for a duration relating to the non-access period prior to again providing additional gaming services to the gaming terminal, wherein the gaming interface indicates to the player that the gaming services will not be provided for the duration. Also this aspect of the present disclosure provides similar advantages and embodiments as discussed above in relation to the previous aspects of the present disclosure.

The different aspects according to the present disclosure may also be implemented as a computer program product. Such a computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
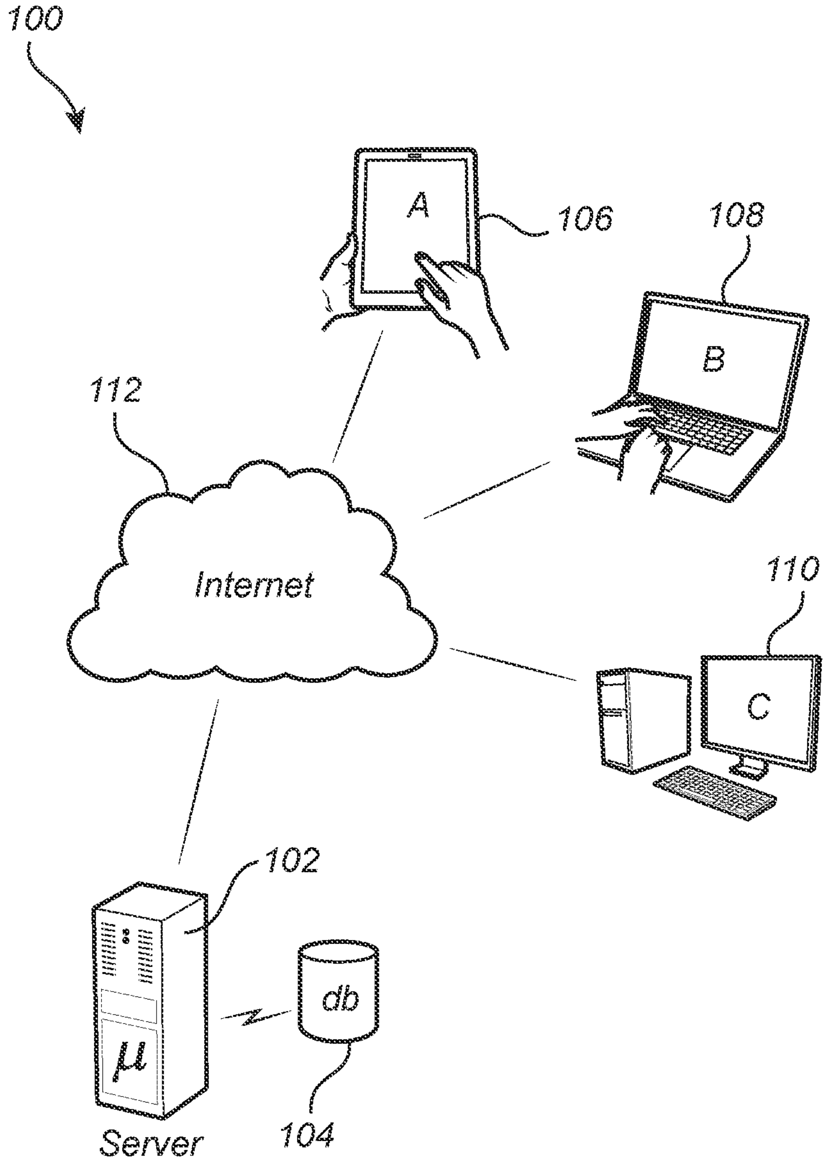
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 adapted to provide a gaming service. In FIG. 1 the gaming service is exemplified by an online game, such as a slot game. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of gaming terminals, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, 5G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further gaming terminal device 114 may be fixed systems, mobile systems, portable systems, or cloud systems (as discussed above). FIG. 1 shows only three gaming terminal devices 106, 108, 110, however it should be understood that a general implementation of the present disclosure comprises a large plurality of gaming terminal devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
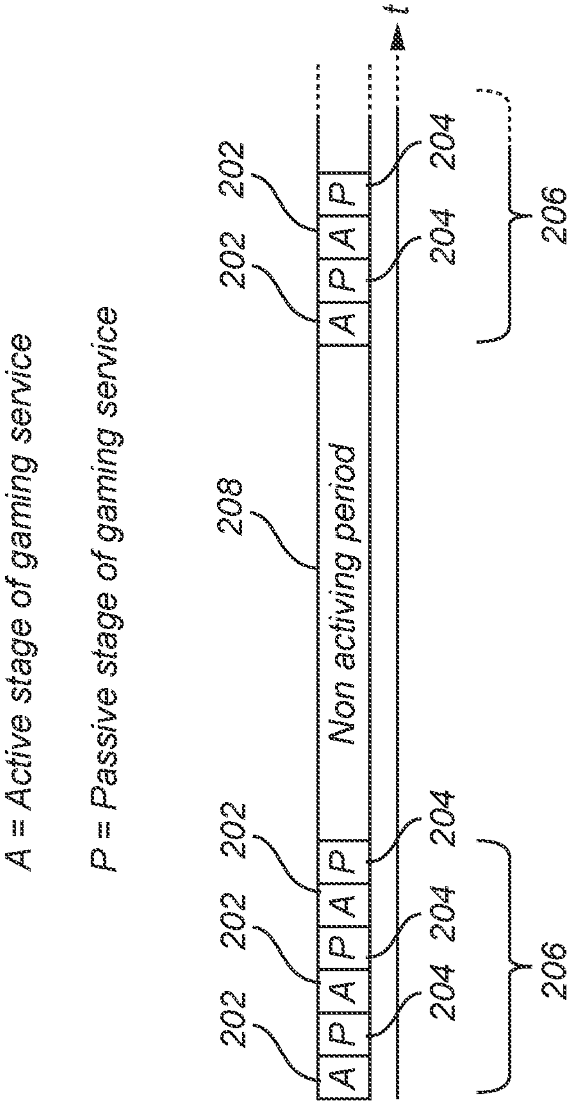
FIG. 2 presents an exemplary timeline for controlling access to gaming services provided by means of the gaming system as shown in FIG. 1, FIG. 3 provides an exemplary illustration of a typical graphical user interface (GUI) for use in playing a game.
Figure 4:
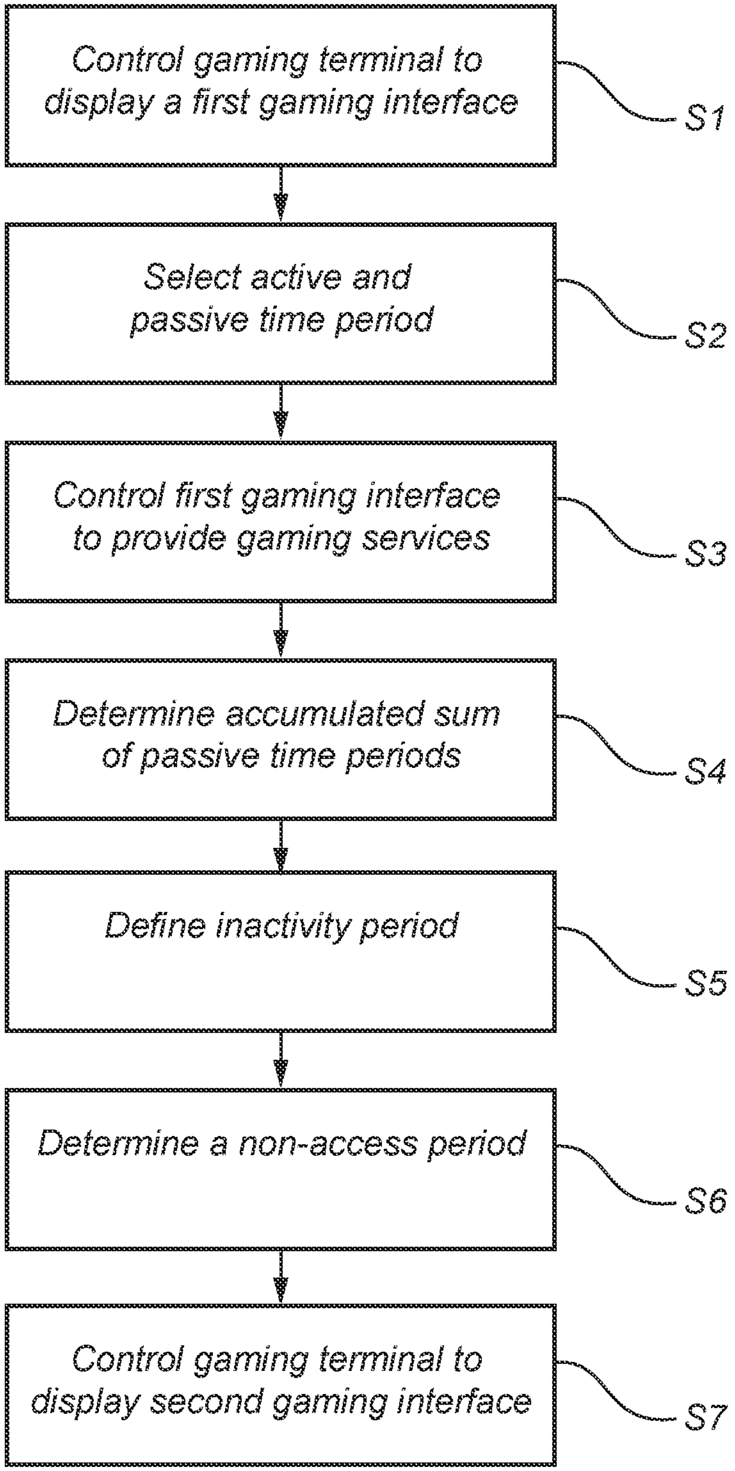
FIG. 4 is a flow chart illustrating the exemplary steps for operating the gaming system as shown in FIG. 1.

Turning now to FIG. 2 in conjunction with FIG. 4, presenting a general and exemplified timeline for controlling access to the gaming services provided by means of the gaming system as shown in FIG. 1. The process starts by controlling, S1, e.g. the client device 106 to display a first gaming interface within the GUI, wherein the first gaming interface comprises a first element, such as in the form of a "start button" that when operated by the player is adapted to form a gaming service initiation. In response to receiving the gaming service initiation, the server 102 selects, S2, an active time period 202 and a passive time period 204 for a single gaming service. As discussed above, the active and passive time periods 202, 204 correspond to different stages of the gaming service provided by the server 102.

The server 102 will then control, S3, a second element of the first gaming interface to provide a series of consecutive gaming services during a first predefined time period 206. In FIG. 2 the series of gaming services comprises three gaming services. Three is however just for providing an illustration of the scheme according to the present disclosure. The series may comprise any number of gaming services (also including a single game). As is illustrated in FIG. 2, each gaming service first comprises the active stage (and thus the active time period 202) followed by the passive stage (corresponding to the passive time period 204).

The server 102 will subsequently determine, S4, an accumulated sum of passive time periods 204 during the first predefined time period 206. In FIG. 2, the accumulated sum will correspond to three times the passive time period 204 or an average of the three passive time periods. The server 102 will also define, S5, an inactivity period for the first predefined time period 206 based on a preselected passive time period, where the preselected passive time period for example may be based on a geographical location of the client terminal 106 and/or the player operating the client terminal 106.

Based on the knowledge of the inactivity period and the determined accumulated sum the server 102 has been adapted to determine, S6, a non-access period 208. The non-activity period 208 is in turn used by the server 102 for controlling, S7, the client device 106 to display a second gaming interface within the GUI for a duration relating to the non-access period. When the non-access period has passed, it will again be possible to the server 102 to control the client device 106 to provide a further gaming service. As indicated above, e.g. a countdown timer may be shown within the GUI of the client device 106 for at least a portion of the non-access period 208. Alternatively a pop including reasons for the non-access period may be shown within the GUI of the client device 106 for at least a portion of the non-access period 208.

Figure 3:
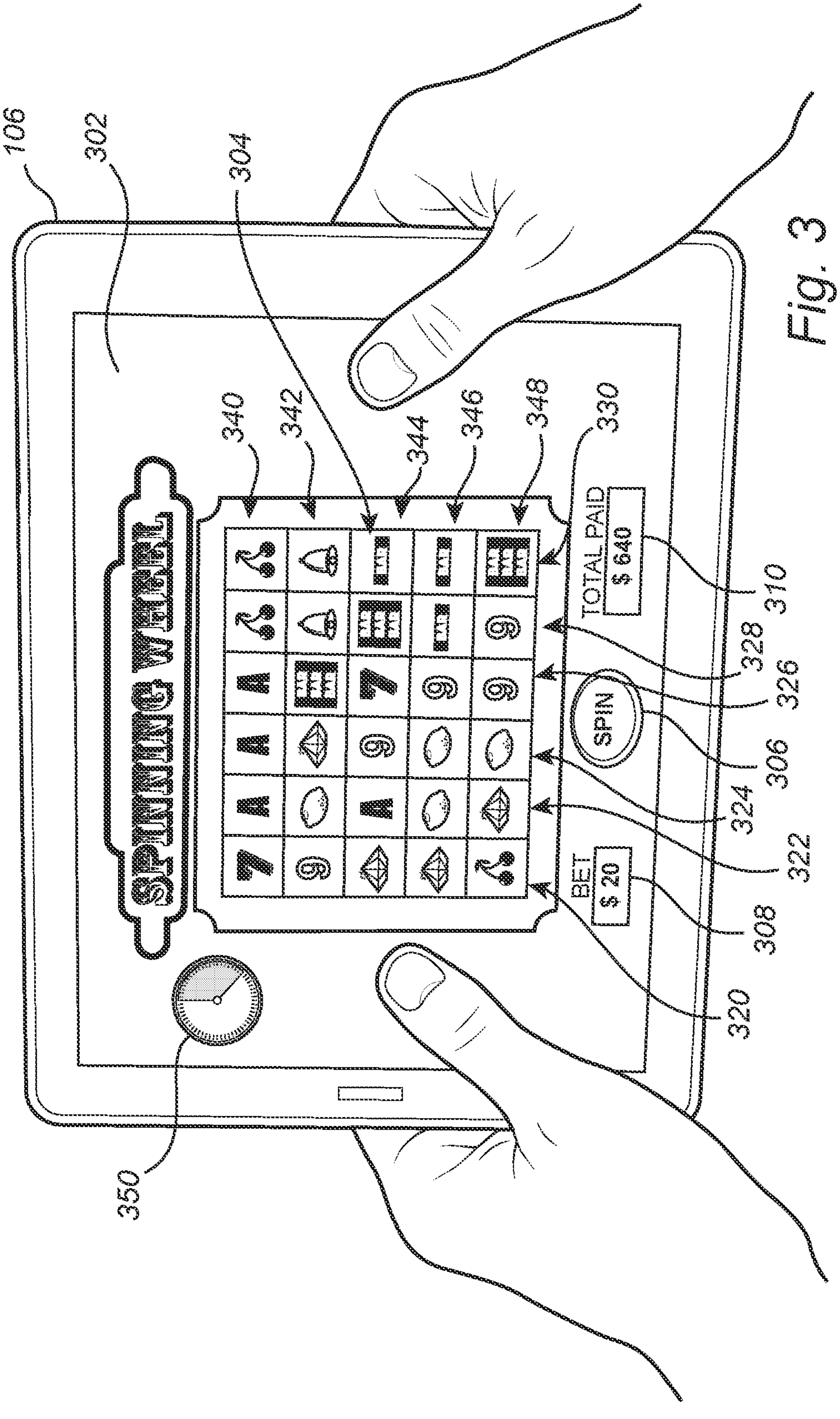

Turning now to FIG. 3 illustrating a graphical user interface (GUI) 302 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 302 as comprising a table comprising six individual reels 320, 322, 324, 326, 328, 330 arranged in columns and provided with a plurality of different symbols. The table also comprises five reels 340, 342, 344, 346, 348.

The GUI 302 also comprises a "button" 306 to start the game, here provided with the description "SPIN" for initiating a turn of the game. In addition, the GUI 302 comprises an indicator of the current bet 308 (i.e. payment for each turn of the game) and an indicator of the total payment to the player 210. It should in any case be understood that other types of games may be played within the scope of the present disclosure, for example being skill based as compared to a game of chance.

In line with the present disclosure, the access scheme is introduced in order to ensure that players play responsibly. This may for example be manifested, as discussed above, by allowing the reels 320, 322, 324, 326, 328, 330 to spin for the duration of the passive time period 204, ensures that game play is slowed down. While this may be a solution to responsible game play, it may detract from the attractiveness of the game as players may become impatient whilst waiting for the result of the game. In order to ensure a balance between the attractiveness of the game and responsible game play the present disclosure proposes that the game play continue at an ultimate speed but that the game play be interrupted in order to slow down the game and ensure responsible play.

In such an instance a selected predetermined turn time of the game is set. This may for example vary depending on geographical locations, possibly applying different gaming legislations. An actual turn time of the game is also set. The game is then interrupted for a time period that corresponds to the difference between the selected predetermined turn time of the game and the actual turn time of the game.

The present disclosure can be carried out in various ways. A first option to carry out the present disclosure is to calculate the difference between the selected predetermined turn time of the game and a single turn of the game. In such a case the actual time of a single turn of the game is measured. The difference between the preselected time of the turn and the actual turn time of the single turn is calculated by simply subtracting the two. The game will then be interrupted by this difference after each turn of the game.

A second option to carry out the present disclosure is to calculate the difference between the selected predetermined turn time of the game and the actual turn time of the game over a time interval, corresponding to the first predefined time period 206. In such a case the method of the present disclosure requires the calculation of the expected number of turns in an interval. To determine this a time interval has to be set, for example a time interval of 15 minutes i.e. 900 seconds. Then the selected predetermined turn time has to be set for example 5 seconds a turn. The expected number of turns in an interval is then calculated by taking the selected time interval in seconds and dividing that by the selected predetermined time being 5 seconds. The result is 180 turns. Next the present disclosure requires that the method determine the actual number of turns in the time interval. This is logged by the system, let's say for example 200 turns. In order to determine the time in which to interrupt the game play, the difference between the actual number of turns in the time interval and the expected number of turns is determined (200 minus 180=20 turns). The result is then multiplied by the selected predetermined turn time (20×5=100 seconds. The game will then be interrupted for 100 seconds after the 15-minute time interval lapses.

A third option of the present invention is to calculate the difference of a preselected passive time period of the game over a period of time and an actual passive time period of the game over a period of time. This relates to, for example, a player, regulation or a game provider setting a time period for a number of games to be played over a time period. If a player activates a passive time period too quickly, then the actual passive time period of the game over a period of time will be greater than the preselected passive time period over a period of time and this will in turn trigger an inactive time period.

The present disclosure provides for the implementation of all the above options as well as combinations thereof.

It is preferable to introduce a count timer 350 during the interruption of the game, defining the second gaming interface. When displaying the second gaming interface, it may also be possible to "remove" or inactivate the start button 306.

In summary, the present disclosure relates to a method of controlling access to a gaming service provided by a server, the server arranged in network communication with a gaming terminal operated by a player, the gaming terminal comprising a display unit adapted to provide a graphical user interface (GUI), wherein the method comprises the steps of directing, using the server, the gaming terminal to display a first gaming interface within the GUI, wherein the first gaming interface comprises a first element that when operated by the player is adapted to form a gaming service initiation, selecting, at the server and in response to the gaming service initiation being received at the server, an active time period and a passive time period for a single gaming service, wherein the active time period relates to active interaction of the player with the GUI and the passive time period relates to passive interaction of the player with the GUI, controlling, using the server, a second element of the first gaming interface to provide a series of consecutive gaming services during a first predefined time period, the first predefined time period taking place within the single gaming service, determining, using the server, an accumulated sum of passive time periods of passive interaction of the player with the GUI taking place during the first predefined time period, defining, using the server, a desired inactivity period for the first predefined time period based on a preselected passive time period, determining, using the server, a non-access period based on a comparison between the desired inactivity period and the determined accumulated sum of passive time periods, and directing, using the server, the gaming terminal to display a second gaming interface within the GUI for a duration relating to the non-access period prior to again controlling the gaming terminal to display the first gaming interface, wherein the second gaming interface is different from first gaming interface.

An advantage following such a possibility is the balance between ensuring responsible gambling and an improved attraction power to the game, thus potentially allowing for the player to remain playing the game for an increased duration as compared to previously known similar operational schemes. This could potentially be beneficial to both the player participating in the game and the gaming operator providing the game.

In addition, the control functionality of the present disclosure may be implemented using existing computer processors, or by a special purpose computer processor for an appropriate system, incorporated for this or another purpose, or by a hardwired system.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A method of controlling access to gaming services provided by a server, the server arranged in network communication with a gaming terminal operated by a player, the gaming terminal comprising a display unit adapted to provide a graphical user interface (GUI), wherein the method comprises:

selecting, at the server, an active time period and a passive time period for each gaming service, wherein the active time period relates to active interaction of the player with the GUI and the passive time period relates to passive interaction of the player with the GUI, wherein the active interaction comprises the player placing one or more bets and the passive interaction comprises the player observing a result of the gaming service, providing, using the server, a series of consecutive gaming services to the gaming terminal during a first predefined time period, determining, using the server, a combination of passive time periods of passive interaction of the player with the GUI taking place during the first predefined time period, defining, using the server, a desired inactivity period for the first predefined time period, determining, using the server, a non-access period based on a comparison between the desired inactivity period and the determined combination of passive time periods, and directing, using the server, the gaming terminal to display a gaming interface within the GUI for a duration relating to the non-access period prior to again providing additional gaming services to the gaming terminal, wherein the gaming interface indicates to the player that the gaming services will not be provided for the duration.

2. The method according to claim 1, wherein the method further comprises:

receiving, at the server, an indication of a regulative requirement for the player or the gaming terminal, and determining, using the server, the preselected passive time period based on the indication of the regulative requirement.

3. The method according to claim 2, wherein the indication of the regulative requirements is selected from a group comprising at least one of a geographic location for the player, a regulation set by the player, and a regulation set by a provider of the gaming services.

4. The method according to claim 2, wherein the regulative requirement defines a predefined period of play time.

5. The method according to claim 1, further comprising:

determining, using the server, a relation between the active time periods and the passive time periods, and estimating, using the sever, a game speed based on the determined relation.

6. The method according to claim 5, further comprising:

directing, using the server, the gaming terminal to display a graphical illustration of the estimated game speed within the GUI.

7. The method according to claim 5, wherein the non-access period is further dependent on the estimated game speed.

8. The method according to claim 5, further comprising:

comparing, using the server, the estimated game speed with a predefined game speed, wherein a result of the comparison is applied as a weight to the non-access period, wherein the non-access period is increased if the estimated game speed is larger than the predefined game speed.

9. The method according to claim 1, wherein the gaming interface comprises a countdown timer displayed within the gaming interface and operated for the second predefined duration.

10. The method according to claim 1, wherein the gaming service comprises a multi-reel slots gaming component.

11. An electronic gaming system adapted for access control, the electronic gaming system comprising:

a server, and a gaming terminal arranged in network communication with the server and arranged to be operated by a player, wherein the electronic gaming system is adapted to:

select, at the server, an active time period and a passive time period for each gaming service, wherein the active time period relates to active interaction of the player with the GUI and the passive time period relates to passive interaction of the player with the GUI, wherein the active interaction comprises the player placing one or more bets and the passive interaction comprises the player observing a result of the gaming service, provide, using the server, a series of consecutive gaming services to the gaming terminal during a first predefined time period, determine, using the server, a combination of passive time periods of passive interaction of the player with the GUI taking place during the first predefined time period, define, using the server, a desired inactivity period for the first predefined time period, determine, using the server, a non-access period based on a comparison between the desired inactivity period and the determined combination of passive time periods, and direct, using the server, the gaming terminal to display a gaming interface within the GUI for a duration relating to the non-access period prior to again providing additional gaming services to the gaming terminal, wherein the gaming interface indicates to the player that the gaming services will not be provided for the duration.

12. The electronic gaming system according to claim 11, wherein the electronic gaming system is further adapted to:

receive an indication of a regulative requirement for the player or the gaming terminal, and determine the preselected passive time period based on the indication of the regulative requirement.

13. The electronic gaming system according to claim 11, wherein the indication of the regulative requirements is selected from a group comprising at least one of a geographic location for the player, a regulation set by the player, and a regulation set by a provider of the gaming services.

14. The electronic gaming system according to claim 11, wherein the active time period has a predefined duration.

15. The electronic gaming system according to claim 11, wherein the regulative requirement defines a predefined period of play time.

16. The electronic gaming system according to claim 11, wherein the second gaming interface comprises a countdown timer displayed within the second gaming interface and operated for the second predefined duration.

17. The electronic gaming system according to claim 11, wherein the gaming service comprises one of a gaming, betting, or lottery component.

18. The electronic gaming system according to claim 11, wherein the gaming service comprises a multi-reel slots gaming component.

19. A method of controlling access to gaming services provided by a server, the server arranged in network communication with a gaming terminal operated by a player, the gaming terminal comprising a display unit adapted to provide a graphical user interface (GUI), wherein the method comprises:

receiving, at the server, an indication of a regulative requirement for the player or the gaming terminal, defining, at the server, at least one of a first predefined time period, an active time period, or a passive time period based on the indication of the regulative requirement, wherein the active time period relates to active interaction of the player with the GUI and the passive time period relates to passive interaction of the player with the GUI, providing, using the server, a series of consecutive gaming services to the gaming terminal during a first predefined time period, determining, using the server, a combination of passive time periods of passive interaction of the player with the GUI taking place during the first predefined time period, defining, using the server, a desired inactivity period for the first predefined time period, determining, using the server, a non-access period based on a comparison between the desired inactivity period and the determined combination of passive time periods, and directing, using the server, the gaming terminal to display a gaming interface within the GUI for a duration relating to the non-access period prior to again providing additional gaming services to the gaming terminal, wherein the gaming interface indicates to the player that the gaming services will not be provided for the duration.

20. The method according to claim 19, wherein the active interaction comprises the player placing one or more bets and the passive interaction comprises the player observing a result of the gaming service.

* * * * *